United States Patent
Bertsch-Frank et al.

[11] Patent Number: 6,117,409
[45] Date of Patent: Sep. 12, 2000

[54] PROCESS FOR PRODUCING HYDROGEN PEROXIDE BY DIRECT SYNTHESIS

[75] Inventors: Birgit Bertsch-Frank, Gründau; Torsten Balduf, Hanau; Catrin Becker-Balfanz, Frankfurt; Ina Hemme, Hanau; Jürgen Rollmann, Plaumheim; Rüdiger Schütte; Werner Wildner, both of Alzenau, all of Germany

[73] Assignee: Degussa-Hüls Aktiengesellschaft, Frankfurt, Germany

[21] Appl. No.: 09/289,603

[22] Filed: Apr. 12, 1999

[30] Foreign Application Priority Data

Apr. 11, 1998 [DE] Germany ................ 198 16 296

[51] Int. Cl.⁷ ................................................ C01B 15/01
[52] U.S. Cl. .................................................. 423/584
[58] Field of Search .................................... 423/584

[56] References Cited

U.S. PATENT DOCUMENTS 4,681,751  7/1987  Gosser ............................ 423/584
5,169,618  12/1992  Maraschino .................... 423/584

FOREIGN PATENT DOCUMENTS

| 0274830 | 7/1988 | European Pat. Off. |
| 0366419 | 5/1990 | European Pat. Off. |
| 0579109 | 1/1994 | European Pat. Off. |
| 97/32812 | 9/1997 | WIPO |

*Primary Examiner*—Steven P. Griffin
*Assistant Examiner*—Maribel Medina
*Attorney, Agent, or Firm*—Smith Gambrell & Russell, LLP

[57] ABSTRACT

An aqueous solution of hydrogen peroxide is produced by direct synthesis from hydrogen and oxygen in the presence of a heterogeneous catalyst. According to the invention, a gas mixture comprising $H_2$ and $O_2$, essentially saturated or supersaturated with water (=containing fog) is fed into a reactor containing the catalyst. The volume ratio of the gas mixture fed in (standard liters per hour) to liquid removed (liters per hour) is adjusted to a value equal to or greater than 15,000, especially 20,000 to 50,000, and the gas mixture leaving the reactor is recycled after replenishment with $H_2$, $O_2$, and $H_2O$ vapor. Solutions with high $H_2O_2$ concentration can be obtained according to the invention without additional concentration.

14 Claims, 1 Drawing Sheet

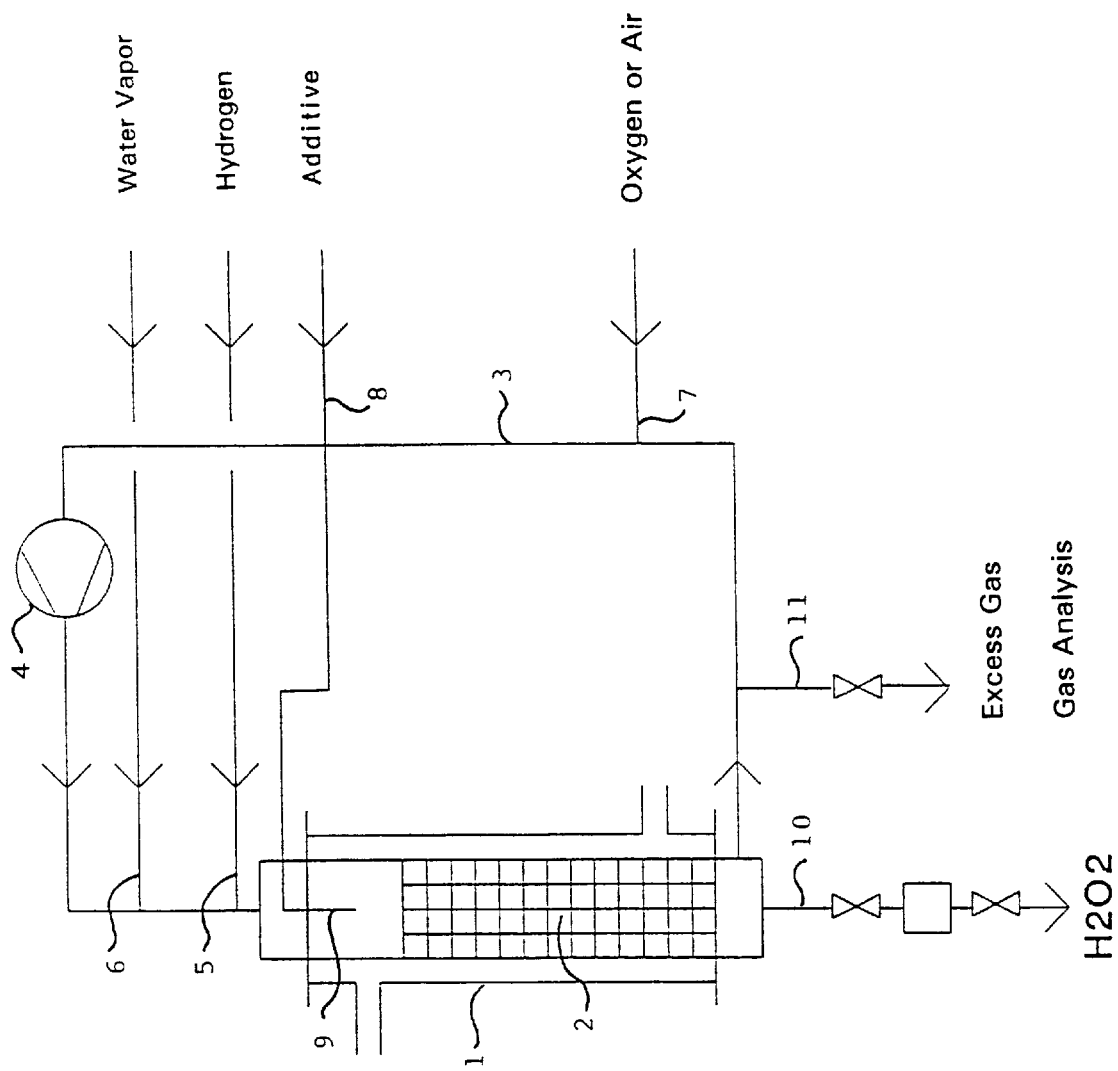

PROCESS FOR PRODUCING HYDROGEN PEROXIDE BY DIRECT SYNTHESIS

DESCRIPTION

The invention concerns a process for producing hydrogen peroxide in the form of an aqueous solution by direct synthesis from hydrogen and oxygen. The synthesis is done on a heterogeneous catalyst in the presence of water.

The direct synthesis of hydrogen peroxide by reaction of hydrogen with oxygen in an acidic aqueous medium in the presence of a noble metal carrier/catalyst is known from various documents. See, for instance, U.S. Pat. Nos. 4,009, 252 and 4,681,751 and European Patent 0 274 830. The processes described in these documents employ a pure aqueous reaction medium which contains a strong acid, such as $H_2SO_4$ and/or HCl, to inhibit decomposition of the hydrogen peroxide produced. The reaction is catalyzed by Pd on activated carbon or other heterogeneous catalysts containing Pd and/or Pt. Selectivity is improved by adding a bromide promoter. These processes have various problems, including inadequate selectivity and/or insufficient $H_2O_2$ concentration and low space-time yield, excessive loss of catalyst, and high corrosivity.

Many documents are directed toward preparation of improved catalysts for this class of process, reducing catalyst loss, and/or reducing the corrosive properties of the medium. See, for instance, European Patent Applications 0 366 419, 0 498 166, 0 504 741 and 0 492 064.

A process of this type can be carried out as described in European Patent Application 0 366 419, in which a gas mixture containing $H_2$ and $O_2$ is passed over a catalyst bed in a trickling bed reactor while an aqueous phase containing $H_2SO_4$ and HCl trickles concurrently over the catalyst bed. The aqueous phase is recycled. This process utilizes a noble metal catalyst bonded to a hydrophobic carrier under usual temperature and pressure conditions, and does indeed attain high selectivity, but with the disadvantage of a very low $H_2O_2$ concentration (0.15 to 0.3%). The process must be followed by concentration and/or distillation stages to get $H_2O_2$ solutions of the type commercially available. Those are expensive, and reduce the profitability of the process.

European Patent Application 0 579 109 teaches an improvement on the process discussed above. Here, again, a liquid phase trickles over a catalyst bed concurrently with the gas mixture containing $H_2$ and $O_2$. The catalyst bed is a noble metal bonded to activated carbon, or an inorganic oxide or sulfate. It is important to maintain the ratio of the volume of the gas phase to that of the liquid phase in the range of 500 to 10,000. For example, with good selectivity with respect to $H_2$, an aqueous hydrogen peroxide solution containing about 5% by weight $H_2O_2$ can be obtained. Even this $H_2O_2$ concentration, which is low in comparison with the marketable concentrations, generally requires the process to be followed by concentration.

According to the process described in U.S. Pat. No. 5,169,618, a gas phase containing $H_2$ and $O_2$, most suitably one in which the ratio of $H_2$ to $O_2$ partial pressures is about 1 to 10, and an acidic aqueous phase, are passed over a fixed catalyst bed in a pulsed flow. The liquid phase and the gas phase leaving the reactor are replenished and recycled. The pulsed flow system is said to achieve an improved transfer of $H_2$ to the catalyst, and thus an increased space-time yield. It is possible, in this process, to remove from the loop an aqueous solution containing up to 20% by weight hydrogen peroxide. According to the example, the "pulse-flow regime" can be maintained at a volume ratio of gas phase to liquid phase of about 100 to 150, but the cost of process and control equipment is high. Thus there is a need for a process concept which can be operated more simply.

The process according to WO 97/32812 likewise operates with a fixed catalyst bed, but in the absence of any solvent. The reaction gas mixture flowing through the fixed bed is unsaturated with water and hydrogen peroxide. The hydrogen peroxide formed is separated from the reaction gas in a separation stage following the reactor. As the reaction occurs in the absence of a liquid, the reaction rate and yield are high. The fact that a very high volumes of gas must be recirculated to avoid condensation of $H_2O$ and $H_2O_2$ in the reactor is a disadvantage. To isolate the hydrogen peroxide, the pressure in the subsequent separation stage must be greatly increased, and/or the temperature must be reduced. But there is a high safety hazard in compressing a gas phase containing $H_2O_2$, and the compression stage is technically expensive.

The object of the invention is to provide another process of this type by which an aqueous $H_2O_2$ solution containing at least 10% by weight can be taken directly from the reactor. The process should be industrially safe and simple to operate.

The object is attained by a process for producing an aqueous solution of hydrogen peroxide, comprising a direct synthesis from hydrogen and oxygen, whereby a gas mixture containing hydrogen and oxygen flows continuously over the surface of a catalyst arranged as a fixed bed in the reactor, or as a wall coating, in the presence of water, and the aqueous hydrogen peroxide solution formed is removed at the bottom end of the reactor, characterized in that a gas mixture containing hydrogen and oxygen, essentially saturated or supersaturated with water vapor, is introduced to the reactor; part of the water vapor is caused to condense and/or coalesce within the reactor; the ratio of the gas mixture introduced (standard liters per hour) to liquid removed (liters per hour) is maintained at a value greater than 15,000; and the gas mixture leaving the reactor is replenished with hydrogen, oxygen, and water vapor, and recycled.

In the process according to the invention the liquid phase which trickles over the catalyst bed or along the catalyst-coated wall is produced by condensation and/or coalescence of part of the water vapor in the gas mixture used. When an essentially saturated gas mixture is used—the concept "essentially" indicates 80% to 100% saturation—the reactor temperature is reduced below the dew point. It is convenient to use a gas mixture with is nearly saturated, or, preferably, supersaturated, with $H_2O$. If a supersaturated mixture is used, i. e., one which contains a fog of water, the reactor temperature can be held constant. If necessary, the amount of liquid can be increased by additionally reducing the temperature. The desired quantity of water essential for the concentration of the hydrogen peroxide produced, can, therefore, be controlled by the temperature profile in the reactor and/or by the content of water vapor or water fog in the gas mixture.

It is suitable for the gas phase and the liquid phase which forms to flow concurrently, because this mode of operation can easily avoid flooding of the reactor. To attain a high space-time yield, water is not tickled onto the catalyst bed as a liquid. Instead, it is introduced in the form of a mist which can be obtained, for instance, by compressing the air, which serves as the $O_2$ source. That assures steady operation of the reaction. Use of a gas mixture which is essentially saturated with water vapor, or which contains fog, avoids catalyst overheating and reduction of the selectivity, and an aqueous hydrogen peroxide solution with the desired concentration is obtained directly.

The reaction gases, hydrogen and oxygen, contained in the gas mixture used, are only partially converted in the reactor. The gas mixture leaving the reactor is replenished with hydrogen, oxygen, and water vapor and returned to the reactor. The $H_2$ conversion within the reactor, and, thus, the rate of formation of $H_2O_2$, determines the extent of the gas recirculation. It is important for the invention that a certain ratio of gas mixture introduced per unit time to liquid removed be maintained. The ratio should be equal to, or, preferably, greater than 15,000. A ratio in the range of 20,000 to 50,000 is particularly preferred, and especially a ratio of 25,000 to 40,000. The small volume of liquid phase in proportion to the gas phase assures rapid conversion of the gases, $H_2$ and $O_2$, at the catalyst surface, with high $H_2$ selectivity with respect to $H_2O_2$ production, and production of an aqueous hydrogen peroxide solution with a high $H_2O_2$ concentration at high yield.

The gas mixture, comprising $H_2$, $O_2$, and, if desired, inert gases, should, for safety, have a composition not capable of detonation. The $H_2$ content is generally limited to values about 6% by volume. The $H_2$ content is preferably in the range of 3 to 5% by volume. The oxygen content in the gas mixture can be stoichiometric or greater than stoichiometric. It is suitable to use oxygen solely or predominantly in the form of air. The $O_2$ content in the gas mixture used is generally in the range of 10 to 20% by volume, and especially 18 to 19% by volume. The water vapor required can be added to the gas mixture with the air used, or as such. A gas mixture supersaturated with water vapor contains water in the form of fog.

The pressure and temperature conditions are equivalent to those known from the state of the art. For instance, the reaction temperature can be in the range of 0 to 90° C., but the preferred temperature range is from 20 to 70° C. The pressure can be in the range from atmospheric pressure to about 10 MPa. The reaction is preferably carried out in the range of 0.5 to 5 MPa. It is a particular advantage of the process according to the invention that it can be carried out at low pressures, such as, especially, 1 MPa to less than 5 MPa.

Known catalysts can be used for the reaction in the process according to the invention. These are catalysts with one or more elements of the Groups VIII and/or Ib of the periodic system, especially elements from the series Ru, Rh, Pd, Ir, Pt and Au, with Pd and Pt particularly preferred. The catalytically active element or elements are usually bound to a particulate carrier, but can also be made as a coating with sufficiently great active surface on a monolithic carrier with channels, or on other flat carriers. Carrier-bound noble metal catalysts are particularly preferred as they are suitable for use in trickling bed reactors as a fixed bed with predetermined particle size. The particle size of suitable carriers in the general range of about 0.01 to about 5 mm, and especially in the range of 0.05 to 2 mm. The noble metal content in the carrier/catalyst combination is generally 0.01 to 10 percent by weight.

Suitable carrier materials, other than activated carbon, are water-insoluble oxides, mixed oxides, sulfates, phosphates, and silicates of alkaline earth metals, Al, Si, Sn, and metals of the third to sixth subgroups (IIIa to VIa). Activated carbons are generally preferred carriers, but in selection care should be taken that they have the minimum effect of decomposing hydrogen peroxide. Of the oxides, $SiO_2$, $Al_2O_3$, $SnO_2$, $TiO_2$, $ZrO_2$, $Nb_2O_5$, and $Ta_2O_5$, are preferred, and, of the sulfates, barium sulfate.

According to one particular embodiment, it is advantageous in the selection of a suitable carrier material for the carrier to have acid centers which have a stabilizing effect on the hydrogen peroxide formed. The carrier can, for example, contain a mineral acid, such as sulfuric acid, phosphoric acid, or a heteropolyacid in a fixed form; or an acidic oxide such as $V_2O_5$, is a component of a mixed oxide. Other acidic carriers are acidic inorganic or organic ion exchangers such as acid zeolites, e. g., ZSM5, or polysiloxanes containing sulfonic acid groups, or macroporous organic ion exchangers containing sulfonic acid or phosphoric acid groups.

According to another embodiment, the reaction proceeds in the presence of an acid, especially a mineral acid, such as sulfuric acid, hydrochloric acid, or phosphoric acid. These acids can be applied to the catalyst bed in a liquid form, such as an aqueous solution. Alternatively, it is also possible to add small proportions of acidic gases such as $SO_2$, $SO_3$, $NO_2$ and HCl to the gas mixture being used to reduce the decomposition of $H_2O_2$. Addition of cocatalysts, such as halides, and especially bromides, is also known. Such halides can be fixed to the catalyst carrier, or added to the system in the form of a powder or solution during the reaction.

The reactors to be used in the process according to the invention are preferably designed as trickling bed reactors. Tubular reactors allow simple heat removal through a cooling jacket around them. In such reactors, the gas stream is introduced at the top and the aqueous hydrogen peroxide solution formed and the water-vapor-saturated gas containing $H_2$ and $O_2$ leave at the bottom. According to another type of embodiment, the catalyst is placed on the surface of metallic or ceramic walls in the reactor, which are designed and arranged like those in a plate heat exchanger, or on the surfaces of channels in monolithic catalyst blocks.

The invention is further depicted by means of the following examples.

EXAMPLES

The process according to the invention was tested in a laboratory trickling bed apparatus as shown in the FIGURE.

A tubular double-jacket reactor 1 with a cooling jacket contains a catalyst bed 2 in the inner tube. The gas recirculation line 3 contains the compressor 4 needed for recirculation. The line leads from the lower part of the reactor, where the gas and liquid are separated, back into the upper part of the reactor. Lines to supply hydrogen 5, water vapor 6, oxygen or air 7 and, if required, gaseous additives 8 open into the gas recirculation line. Alternatively, gaseous or liquid additives can enter the reactor head through line 9. Aqueous $H_2O_2$ solution is drawn off at the base of the reactor through line 10. Excess gas can be exhausted through line 11.

The experimental reactor had an inside diameter of 18 mm and a length of 400 mm. The 100 ml of catalyst packing consisted of extruded strands (1.8 mm) of 1% palladium on activated carbon.

The table shows the reaction conditions and results. Synthetic air in compressed gas cylinders, from the Griesheim company, was used as the oxygen component in all the examples (composition: 21% oxygen by volume; remainder nitrogen). The conversion occurred in the presence of an acid and a bromide, which were metered in as aqueous solution. Experiments 1 to 3 were done without gas recycling. That is, the gas leaving the reactor was all exhausted. In Experiment 4 the gas leaving the reactor was replenished with synthetic air and hydrogen. Part of the exit gas was exhausted to eliminate inert nitrogen.

Further variations and modifications of the foregoing will be apparent to those skilled in the art and are intended to be encompassed by the claims appended hereto.

German priority application 198 16 296.0 is relied on and is incorporated herein by reference.

TABLE

| | Example No.: With/without gas recycling | | | |
|---|---|---|---|---|
| | 1 without | 2 without | 3 without | 4 with |
| Gas mixture used (percent by volume) | | | | |
| $H_2$ | 4.0 | 4.0 | 4.0 | 4.0 |
| $O_2$ | 20.0 | 20.0 | 20.0 | 15.0 |
| $N_2$ | 75.4 | 75.4 | 75.7 | 80.9 |
| $H_2O$ | 0.62 | 0.62 | 0.32 | 0.06 |
| $H_2O$ as fog (g/hr) | — | 30.3 | 17.6 | 65.3 |
| Liquid additive (g/hr) | 7.5 | 7.5 | 6 | 12 |
| Composition: | | | | |
| $H_2SO_4$ (moles/liter) | 0.05 | 0.1 | 0.05 | 0.1 |
| NaBr (moles/liter) | 0.0005 | 0.001 | 0.0005 | 0.001 |
| Gas mixture throughput, std. 1/hr | 2000 | 2000 | 1000 | 3334 |
| Pressure (MPa) | 2.0 | 2.0 | 1.0 | 5.0 |
| Temperature | | | | |
| inlet | 50° C. | 50° C. | 25° C. | 25° C. |
| outlet | 20° C. | 25° C. | 25° C. | 25° C. |
| Liquid removal, ml/hr | 23 | 70 | 26 | 104 |
| $H_2O_2$ concentration (% by weight) | 30.5 | 29.1 | 9.7 | 26.4 |
| Volume ratio of gas (std. 1/hr) to liquid (1/hr) | 86103 | 29103 | 39103 | 32103 |

What is claimed is:

1. A process for producing an aqueous solution of hydrogen peroxide by direct synthesis, comprising:

providing a gas mixture comprised of hydrogen gas, oxygen gas and water vapor, wherein the gas mixture is essentially saturated or supersaturated with the water vapor;

contacting the gas mixture through continuous flow with a heterogenous catalyst in a reactor, wherein a part of the water vapor is caused to condense within the reactor;

removing from the reactor a solution which is formed from the condensation of a part of the water vapor, which solution is an aqueous solution of hydrogen peroxide, wherein a ratio of the gas mixture introduced, in std. liters/hour, to the liquid formed and removed, in liters/hour, is adjusted to a ratio of at least 15,000; and recycling the gas mixture by removing the gas mixture from the reactor, and replenishing the gas mixture with hydrogen gas, oxygen gas and water vapor.

2. The process according to claim 1, wherein the ratio of gas mixture introduced to the liquid condensed and removed is maintained in the range of 20,000 to 50,000.

3. The process according to claim 1, wherein the gas mixture contacted with the heterogeneous catalyst is supersaturated with water vapor.

4. The process according to claim 1, wherein the gas mixture comprises from 3–5 percent hydrogen, by volume, and 10 to 20 percent oxygen, by volume.

5. The process according to claim 4, wherein the gas mixture comprises 18–19 percent oxygen, by volume.

6. The process according to claim 1, wherein the formation of aqueous hydrogen peroxide solution is carried out at a temperature from 20 to 70° C. and a pressure from 0.1 to 10 MPa.

7. The process according to claim 6, wherein the pressure is from 1 to 5 MPa.

8. The process according to claim 1, wherein the heterogeneous catalyst is a member selected from the group consisting of iron, ruthenium, osmium, cobalt, rhodium, iridium, nickel, palladium, platinum, and mixtures thereof.

9. The process according to claim 8, wherein the metal is at least one member selected from the group consisting of ruthenium, rhodium, palladium and platinum.

10. The process according to claim 8, wherein the catalyst is bound to a carrier comprised of at least one member selected from the group consisting of activated carbon, inorganic metal oxides, and silicates.

11. The process according to claim 8, wherein the catalyst is bound to a carrier comprised of at least one member selected from the group consisting of activated carbon, $SiO_2$, $Al_2O_3$, $ZrO_2$, $TiO_2$, and acidic silicates with zeolite structure.

12. The process according to claim 1, wherein the heterogeneous catalyst comprises a carrier-bound catalyst with a mean particle size of 0.05 to 3 mm placed as a fixed bed in the reactor, which is a tubular trickling bed reactor.

13. The process according to claim 1, wherein the formation of an aqueous solution of hydrogen peroxide is carried out in the presence of at least one member selected from the group consisting of an acid, a mineral acid, and a halide.

14. The process according to claim 13, wherein the halide is a bromide.

* * * * *